Patented Dec. 14, 1948

2,456,255

UNITED STATES PATENT OFFICE 2,456,255

POLYMERS OF TRIFLUOROETHYLENE AND PROCESS FOR OBTAINING THEM

Donald D. Coffman and Thomas A. Ford, Wilmington, Del., assignors to E. I. du Pont de Nemours & Company, Wilmington, Del., a corporation of Delaware No Drawing. Application September 19, 1944, Serial No. 554,861

2 Claims. (Cl. 260—80)

1

This invention relates to new compositions of matter and more particularly to polymeric materials.

This case is a continuation-in-part of our application Serial No. 510,965 filed November 19, 1943, now Patent No. 2,419,009.

In the above mentioned application, we have disclosed valuable polymeric products obtained by polymerizing vinyl fluoride with other polymerizable ethylenically unsaturated organic compounds, including trifluoroethylene, in the presence of various polymerization catalysts.

We have now found that polymers of special utility are obtained from trifluoroethylene either alone or in admixture with vinyl fluoride or other unsaturated organic compounds when the polymerization is carried out in the presence of a peroxy catalyst.

This invention has as an object the production of new and useful compositions of matter. A further object is the preparation of valuable high molecular weight polymers comprising trifluoroethylene. Other objects will appear hereinafter.

The practice of the invention is illustrated in the following examples in which the parts are by weight.

Example I

A silver-lined high pressure reactor is flushed with oxygen-free nitrogen and then is charged with 300 parts of deoxygenated water, and 0.3 part of benzoyl peroxide. The reactor is closed, cooled in a solid carbon dioxide-methanol mixture and evacuated, and is then further charged with 25 parts of trifluoroethylene. The reactor is agitated and heated to 80° C. and the pressure in the reactor is then raised to 4000 lbs./sq. in. by the injection of deoxygenated water. The temperature is maintained at 80° C. and additional deoxygenated water is introduced as often as required to maintain a pressure within the range of 3000–4000 lbs./sq. in. The sum of the individual pressure drops during the period between repressuring operation during 8 hours heating is 1300 lbs./sq. in. The reaction vessel is cooled to room temperature, the unreacted portion of the gaseous monomer is bled off and the contents of the reaction tube are discharged. After drying, 3 parts of polytrifluoroethylene are obtained. This polymer is a solid which does not melt at 100° C., but which can be molded into a film at 350° C.

Example II

A silver-lined high pressure reactor is flushed with oxygen-free nitrogen and then is charged with 250 parts of deoxygenated water and 0.3 part of ammonium persulfate. The reactor is closed, evacuated, cooled in a solid carbon dioxide-menthanol mixture, and is then further charged with 10 parts of trifluoroethylene and 75 parts of tetrafluoroethylene. The reactor is agitated and heated to 60° C. and the pressure in the reactor is then raised to 1750 lbs./sq. in. The temperature is maintained at 58–68° C. during 9½ hours and additional deoxygenated water is periodically added so as to maintain a pressure within the range of 800–1750 lbs./sq. in. The sum of the individual pressure drops during the period between repressuring operations over 9.5 hours is 2200 lbs./sq. in. The reaction vessel is cooled to room temperature, the unreacted portion of the gaseous monomers is bled off and the contents of the reaction tube are discharged. After drying, 74 parts of a trifluoroethylene/tetrafluoroethylene copolymer are obtained. Films prepared by hot pressing the polymer between steel plates covered with aluminum foil at 370–380° C. and 12,000 lbs./sq. in. have tensile strengths of 1660 lbs./sq. in. and elongations of 204%. The temperature at which films possess a zero tenacity is 327° C. At a temperature of 400° C. the copolymer can be extruded into continuous filaments under an applied pressure of 90 lbs./sq. in. Films of the copolymer had a power factor loss of 0.0036 and a dielectric constant of 3.42.

A particularly valuable application of this invention is the successful production of polymers consisting essentially of trifluoroethylene, although useful polymers are obtained from mixtures of trifluoroethylene and another polymerizable compound containing at least 5%, based on the weight of the mixture, of the trifluoroethylene.

The polymerizable compounds other than the trifluoroethylene mentioned herein are the unsaturated organic compounds which contain ethylenic unsaturation and which are known to the art as capable of being converted to high molecular weight polymers, i. e., products having a degree of polymerization greater than a dimer or trimer. Examples of such unsaturated compounds include vinyl and vinylidene compounds such as vinyl esters, vinyl acetate, vinyl chloride, and vinyl fluoride; acrylic and methacrylic acids and their derivatives such as the esters of lower aliphatic alcohols, e. g., methyl methacrylate, the anhydrides, the amides, and the nitriles; olefinic hydrocarbons, e. g., ethylene, propylene, isobutylene, styrene, etc., dienes, butadiene, chloroprene, fluoroprene, isoprene; vinylidene halides, vinylidene chloride, vinylidene fluoride, and tetrafluoroethylene and trifluorochloroethylene.

The polymerization can be carried out in bulk, in aqueous dispersion, or in aqueous emulsions by the application of heat using a peroxy compound as catalyst. Catalysts of this kind comprise diacyl peroxides, benzoyl peroxide and lauroyl peroxide, diethyl peroxide, t-butyl hydroperoxide, hydrogen peroxide, ammonium persulfate, sodium persulfate, potassium persulfate and the like.

The temperatures useful for conducting the polymerization range from 40° to 200° C., depending upon the type of catalyst used. With diacyl peroxide catalysts, temperatures ranging from 60–120° C.; with persulfate catalysts, temperatures ranging from 40–100° C.; and with dialkyl peroxide, 100–150° C. are generally used. In general, pressures above atmospheric are used.

The polymeric products of this invention are of particular advantage in the manufacture of molding plastics, films, foils, fibers, and adhesives. Fibers and films of the polymers of this invention can be used as insulating materials by wrapping the articles to be insulated. Solutions of the polymers can be used for coating wires and coils. Dispersions of the polymers can be readily prepared, for example, from solutions of the polymers. For many of these purposes, the polymers may be combined or prepared in the presence of plasticizers, stabilizers, fillers, pigments, dyes, softeners, natural resins, or other synthetic resins.

As many apparently widely different embodiments of this invention may be made without departing from the spirit and scope thereof, it is to be understood that we do not limit ourselves to the specific embodiments thereof except as defined in the appended claims.

We claim:

1. A process for obtaining a solid film-forming moldable polymer consisting of polymeric trifluoroethylene, said process comprising heating at a temperature of 40° C. to 200° C. in contact with a peroxy catalyst under a pressure of from 3000 to 4000 pounds per square inch polymerizable monomeric material consisting of trifluoroethylene until said polymer is obtained.

2. A solid, film-forming, moldable polymer consisting of polymeric trifluoroethylene.

DONALD D. COFFMAN.
THOMAS A. FORD.

REFERENCES CITED

The following references are of record in the file of this patent:

UNITED STATES PATENTS

| Number | Name | Date |
|---|---|---|
| 1,998,309 | Clark | Apr. 16, 1935 |
| 2,161,078 | Mugdan et al. | June 6, 1939 |
| 2,334,195 | Hopff | Nov. 16, 1943 |